No. 626,434. Patented June 6, 1899.
A. F. MARTIN.
HAY RAKE ATTACHMENT.
(Application filed Feb. 23, 1899.)
(No Model.)
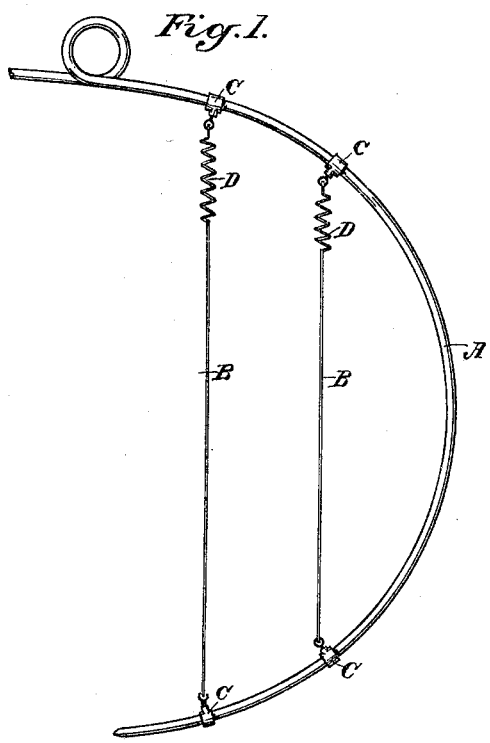
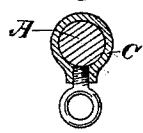
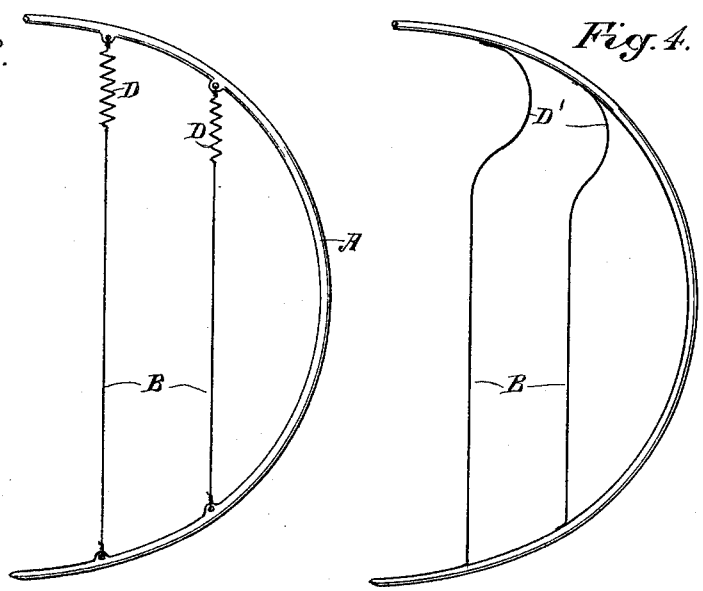
Witnesses,
Inventor
Arthur F. Martin
By Dewey Strong & Co.
Attys

UNITED STATES PATENT OFFICE.

ARTHUR FLAVIUS MARTIN, OF CHESTER, CALIFORNIA.

HAY-RAKE ATTACHMENT.

SPECIFICATION forming part of Letters Patent No. 626,434, dated June 6, 1899.

Application filed February 23, 1899. Serial No. 706,539. (No model.)

*To all whom it may concern:*

Be it known that I, ARTHUR FLAVIUS MARTIN, a citizen of the United States, residing at Chester, county of Plumas, State of California, have invented an Improvement in Hay-Rake Attachments; and I hereby declare the following to be a full, clear, and exact description of the same.

My invention relates to an attachment which is especially designed for use on what are known as "spring-tooth" hay-rakes.

It consists, essentially, in the employment of one or more wire guards extending across the arc of the outer teeth of the rake for the purpose of preventing the hay at the ends from falling or being dragged out.

It also comprises details of construction, which will be more fully explained by reference to the accompanying drawings.

Figure 1 is a view of an end tooth, showing my attachment. Fig. 2 is a detail of a clamp on the tooth. Fig. 3 shows a different fastening for the guard-wires. Fig. 4 shows the guard-wires soldered to the tooth.

In raking hay of various kinds with this class of rakes, and especially clover, wild hay, or any light hay, the curved teeth of the rake pass under the hay, and the hay is pushed up inside the curve of the teeth until it falls forward, and is then pushed back by the incoming hay, thus revolving in front of the teeth until enough has accumulated to stop the revolution, at which time it is usually dumped in the windrow. During this operation there is considerable loss on account of the hay working out between the end teeth and the wheels by which the rake is carried. The hay which falls out from the end away from the unraked hay is lost unless the ground is again raked over, while that which falls at the end next to the unraked section does not fall upon the unraked hay, but at one side or along the edge, so that at the next round the ground which has already been raked will have to be partly covered again in order to save this hay which has been lost. The object of my invention is to prevent this loss of hay at the ends of the rake. In the drawings I have only shown a single tooth of the ordinary spring-tooth rake, which consists of a series of such teeth fixed in the head, the head being supported and turnable from the axle of a pair of wheels which travel just outside the ends of the rake, the whole apparatus being drawn by a horse.

A is a tooth of such a rake, having any suitable or desired arc and curvature.

B B are the wires or guards which I employ for the purpose of preventing the loss of hay at the ends of the rake. These wires are connected with the teeth so as to extend across the arc in the form of chords. Various means may be employed for attaching the wires. They may be brazed, welded, or otherwise fixed solid to the teeth, or the teeth may have eyes formed integral with themselves into which the ends of the wires are connected. The preferable way is to employ clamps such as are shown at C, the clamps being provided with screw-eyes by which they can be fixed at any desired point and the eyes serve for the attachment of the wires.

I prefer to make the wires with some portion of them elastic, as shown at D in Figs. 1 and 3 or at D' in Fig. 4, so as to allow for the spring of the teeth. I have found it preferable to secure the lowermost end of the wire at a distance of from three to five inches from the ends of the teeth, and it extends upwardly, so that when the rake is in its working position these wires are approximately vertical.

It will be understood that the wires may be made in various ways to provide the necessary spring or elasticity, or they can be extended across directly without any spring, the object in any case being to provide an attachment which will prevent the escape of the hay at the ends of the rake.

The manner in which the device operates is as follows: The ends of the teeth which project below the guard act in the same manner as the others; but when the ends of the straw or hay, which extend beyond the end of the teeth, strike the wire of the guard the ends of the straws are bent inward, so that they will pass on the inside of the guards, because the straws forming the mass of hay inside the rake are intertwined and sufficiently coherent to hold themselves together. As the hay in its revolution passes back and forth past the wire the ends of the straws cannot pass beyond the last tooth and strike the wheel, which under ordinary conditions is an element in pulling out the hay, because in its rotation it moves in the opposite direction from the movement of the rake, and thus tends to pull out more or less hay where the guards are not used. I have found that one or two of these wires are practically sufficient for the purpose; but I do not desire to limit myself to any particular number.

Having thus described my invention, what I claim as new, and desire to secure by Letters Patent, is—

1. In a spring-tooth rake, the end teeth thereof, having wires extending in an approximately vertical direction across the arc of said teeth in the form of a chord and connecting the upper part of each end tooth with the lower portion proximate to the point thereof, and serving as a guard to prevent hay working out at the ends of the rake.

2. A guard attachment for spring-toothed rakes, consisting of one or more wires having the ends fixed to the exterior teeth of the rake and extending across the arc of the teeth in the form of chords, with elastic intermediate sections.

3. A guard attachment for spring-toothed rakes consisting of wires having an elastic section, clamps adapted to be adjustably secured upon the outer teeth of the rake and screw-eyes by which they are secured in position, said screw-eyes also forming an attachment for the ends of the wires.

4. A guard attachment for spring-toothed rakes, consisting of wires having a portion of their length made elastic, connections with the exterior teeth of the rake to form attachments for the ends of the wires, said connections being so disposed that the wires extend in an approximately vertical position from the upper part of the tooth to attachments adjacent to the point thereof when the teeth are in operative position.

In witness whereof I have hereunto set my hand.

ARTHUR FLAVIUS MARTIN.

Witnesses:
H. O. REDHEAD,
FRANK SORSOLI.